UNITED STATES PATENT OFFICE.

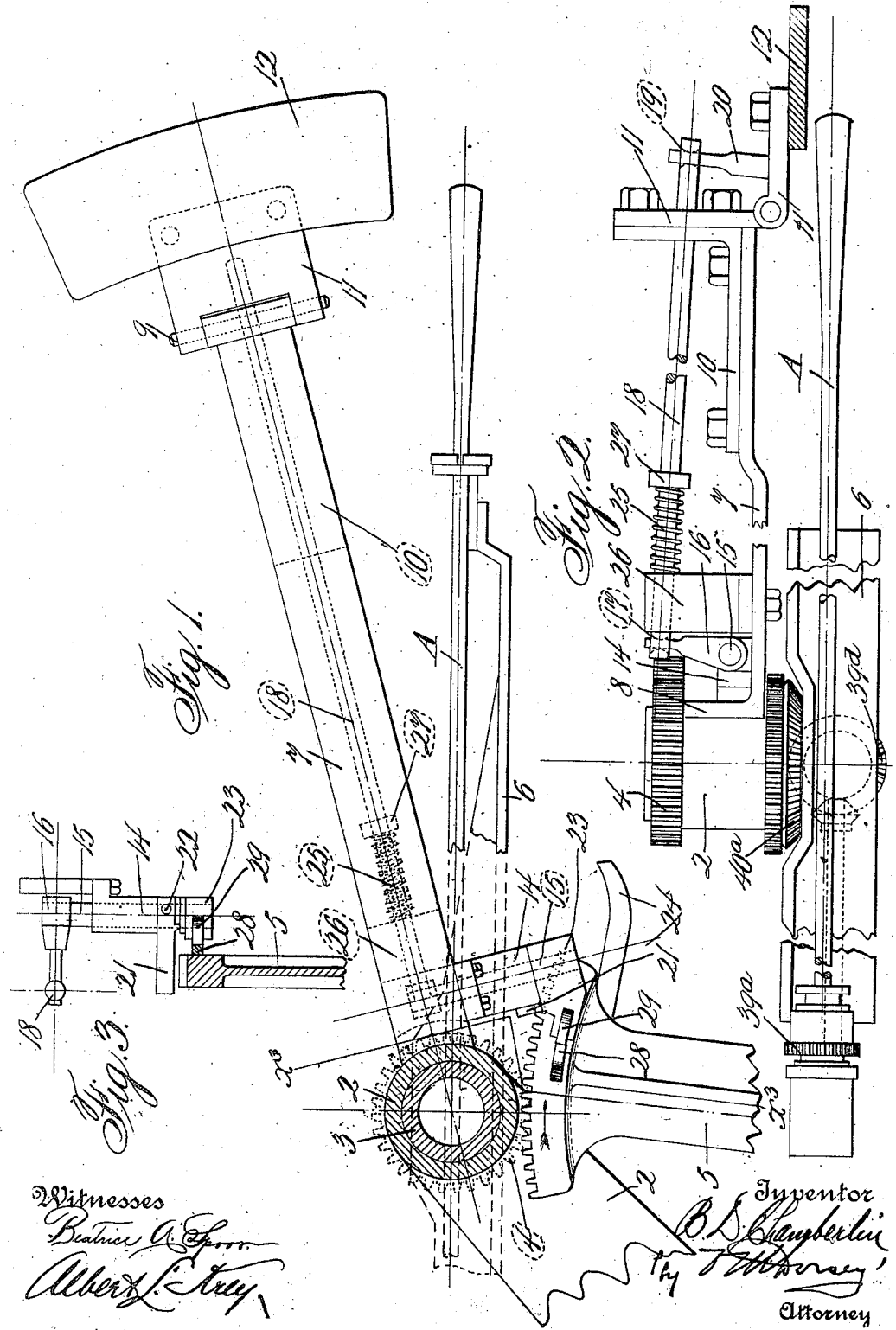

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

GLASS-WORKING APPARATUS.

1,148,212. Specification of Letters Patent. Patented July 27, 1915.

Original application filed January 13, 1911, Serial No. 602,532. Divided and this application filed December 18, 1912. Serial No. 737,403.

*To all whom it may concern:*

Be it known that I, BENJAMIN D. CHAMBERLIN, a citizen of the United States of America, and a resident of Corning, New York, have invented certain new and useful Improvements in Glass-Working Apparatus, of which the following is a specification.

This is a division of my prior application filed January 13, 1911, Serial No. 602,532 (which has since the filing of this application issued into Patent 1,124,698, dated Jan. 12, 1915) and its purpose is to cover certain improvements in marvering mechanism disclosed in my said prior application and particularly applicable to the machine described therein, although susceptible of use with other machines wherein a glass carrier having a rough and irregular body of glass thereon is moved for marvering the glass to work it into a solid homogeneous blank of proper shape and then moved to effect other operations in the productions of the finished article.

The particular machine forming the subject-matter of my prior application, Serial No. 602,532, filed January 13, 1911 (Patent No. 1,124,698) has a pivoted blow-pipe carrier adapted to receive and rotate a removable blow-pipe with a solid gatherer thereon, and adapted to be moved on its pivot to cause the glass to be brought into contact with, and rolled along, a marverer on which it is marvered and properly shaped so that upon elongation it will be of a proper character to form the desired article when blown, after which the blow pipe is positioned for molding.

Inasmuch as the mechanisms to be here covered relate merely to the marvering of the gather on the glass carrier to produce the solid blank of the desired shape and character, so much of the mechanism of my original application as relates to other features and to the construction of the other parts of the apparatus are capable of variation at will, and it will be understood that the details of construction here disclosed are also susceptible of embodiment to fit the general type of machine in which it is desired to marver, the object of the invention being to provide means whereby a body of glass on a suitable glass carrier may be brought into operative relation with the marverer to produce a uniform and desired configuration to the glass, the said means being so constructed that after the marvering the marverer is moved away from the marvered block to permit the removal of such blank past the marverer without contact therewith.

Referring to the accompanying drawings, in which corresponding parts are designated by corresponding marks of reference:—Figure 1 is a side elevation of the marverer and the glass carrier, its support and the operating mechanism whereby the glass carrier is moved for marvering and positioned for further functions, part of the mechanism being shown in dotted lines. Fig. 2 is a plan view of Fig. 1, parts being broken away to facilitate the showing. Fig. 3 is a section on the line $X^3$—$X^3$ Fig. 1.

Suitably carried in the bearing 2 is a trunnion 3, having on its rear end a gear 4 meshing with a rack sector 5 which reciprocates through a limited arc. Mounted on the forward end of the trunnion and fast thereto is the supporting frame 6, adapted to receive the glass carrier, shown in the form of a removable blow-pipe A which is adapted to be moved and positioned with the glass thereon for the several operations by the movement of the frame effected by the rack sector 5 and the gear 4. Means for rotating the glass carrier are provided, which means comprise a beveled pinion $40^a$ driven in any suitable manner and mounted upon the trunnion and meshing with and driving a beveled pinion $39^d$ which in turn drives, by means of the pinion $39^a$, the blow pipe. A skeleton frame 7 is fixed to the bearing 2 by means of the shoulder 8 and projects forwardly and upwardly from the bearing 2, preferably at an angle of about 15°.

Mounted on the outer end of the frame 7 in any appropriate manner is an L frame 10 upon which is fastened a block 11 which is adapted to pivotally support a marverer 12 by means of a vertical pivot 9. The marverer is so located that upon the upward movement of the glass carrier with a gather of glass thereon, the latter will roll upon the outer surface of the plate.

At the completion of the upward movement of the glass carrier, and prior to its return, it is desirable that the marverer be kept out of contact with the glass on the glass carrier and for that purpose the following means are employed: Mounted on the lower end of the frame and adjacent to the bearing 2 is a depending block 14 through which passes a shaft 15, the said shaft having on its upper end a lever 16 projecting rearwardly and entering a recess 17 in a longitudinal link 18 projecting outwardly behind the marverer frame from which it is slidingly carried. In the outer end of the longitudinal link 18 is a recess 19 through which is adapted to pass an arm 20 which is fast to the marvering plate 12. It will be here noted that the rotation of the shaft 15 will cause the rod 18 to move axially, and by means of the arm 20 cause the necessary movement of the marverer 12.

On the lower end of the shaft 15 and below the lower end of the depending block 14 is an actuator 23 having upon its inner end a roller 29 adapted to engage a crown cam 28 upon the forward face of the rack sector 5. Upon the oscillation of the rack sector 5 in an outward direction (see arrow Fig. 1) to cause the upward movement of the supporting frame with the glass carrier and a gather of glass thereon and about the end of such oscillation, the cam roller 29 will climb the face of the cam 28, and through the rod 18 cause the marverer to move rearwardly and away from the plane of movement of the gather of glass. As the rack sector 5 reaches the outward limit of its oscillation and the roller 29 reaches the highest point on the crown cam, a latch 21 pivoted to the depending block 14 at 22 will catch the actuator 23 and hold it in the position it assumes when the roller is at the highest point on the crown cam 28.

By proper mechanism, completely illustrated in my prior application, Serial No. 602,532, filed January 13, 1911, (Patent No. 1,124,698) but not deemed necessary to be shown here, the rack sector 5 is then caused to move in an inward direction thus causing the reverse rotation of the gear 4, this rotation causing a reverse movement of the trunnion 3 and hence a downward movement of the supporting frame with the glass carrier with the gather of glass thereon to position it for other necessary functions such as elongation, blowing and molding. Upon the completion of the reverse movement of the sector 5, the latch 21 is released by an arm 24 upon the sector and which, engages with the latch 21, raising the same whereupon the marverer will be thrown to its normal position for the marvering of the next gather of glass, by an expansion spring 25 surrounding the rod 18 and having one end bearing against a bracket 26 and the other end against a collar 27. It will here be seen that the spring 25 also serves to resiliently hold the marverer against the gather of glass on the glass carrier during the marvering.

It will be noted that in the operation of the mechanism here shown, a glass carrier which, in the specific form shown comprises the usual hollow blow pipe, and having thereon an irregular and undetermined solid mass of glass, is moved along a smooth surface and rolled thereon while in movement, eliminating sliding motion between the glass and the marvering surface. This results in a gradual working of the glass to a more or less cylindrical form with a consequent gradual reduction in diameter and an increase in the density and homogeneity of the glass, and this reduction in the diameter of the glass necessitates a relative movement between the marverer and the plane of movement of the glass-carrier which, in the construction shown is provided for by the spring 25. Thus the blank when it has reached its upper limit of movement along the marverer has been properly shaped and as at the completion of the upward movement of the blank, the marverer has been withdrawn from the plane in which the blank is moving, the perfection of the blank will not be injured by contact between it and the marverer on the downward movement of the glass past the marverer.

I do not in this application broadly claim rotating the glass mass during marvering in combination with a movement of the glass along the marvering surface, or a movement of the marvering surface past the glass, during marvering, as such matter is disclosed in my prior applications, serially numbered 491,812, filed April 23, 1909, and 551,198, filed March 23, 1910, and will be claimed therein with other matter common to this and such other cases, but the claims of this application are restricted to moving the marverer away from the plane of movement of the blow-pipe after the marvering has been done, so that the marvered blank can be reversed in its translatory movement and move past the marverer without contacting therewith.

Having thus described my invention what I desire to secure by Letters Patent is:—

1. In a glass working machine, the combination with a rotating glass carrier, of a marverer, means for moving the glass carrier to work the glass contained thereon upon and along the surface of the marverer, and means effective after the marvering for reversing the movement of the carrier, and to move the marverer away from the plane of movement of the carrier.

2. In a glass working machine, the combination with a rotating glass carrier, of a marverer, and means for moving the glass carrier with a gather of glass thereon along the marverer for marvering, and for positioning the marverer out of the plane of movement of the gather in the order named.

3. In a glass working machine, the combination with a rotating glass carrier, of a marverer, means for moving the glass carrier with the gather of glass thereon along the marverer for marvering, means for positioning the marverer out of the plane of movement of the gather, and means actuated upon the further movement of the gather for restoring the marverer to normal position.

4. In a glass working machine, the combination with a rotating glass carrier, of a marverer, means for moving the glass carrier with the gather of glass thereon along the marverer for marvering, and for returning it in the same path, means for positioning the marverer out of the path of movement of the gather prior to the return movement of the gather past the marverer, means for holding the marverer in its retracted position, and means for releasing the marverer after the return movement of the gather past the marverer.

5. In a glass blowing machine, the combination with a pivoted and rotating glass carrier mounted to move in a vertical plane, of a marverer adapted to move in a horizontal plane, means for moving the glass carrier upwardly along the marverer, means for causing a movement of the marverer in a horizontal plane and away from the plane of movement of the carrier upon the completion of the upward movement of the glass carrier, and means for causing a downward movement of the glass carrier past the marverer.

6. In a glass blowing machine, the combination with a frame adapted to receive a blow-pipe, of a marverer, means for moving the blow-pipe frame to marver the gather on the pipe contained therein along the face of the marverer and for reversing its movement and means actuated on the movement of the frame after the marvering to move the marverer away from the plane of movement of the gatherer.

7. In a glass blowing machine, the combination with a frame, adapted to receive a blow-pipe, of a marverer, means for moving the blow-pipe frame with the gather on the blow-pipe therein along the marverer for marvering and for returning the gather past the marverer in the opposite direction, means for moving the marverer away from the plane of movement of the gather prior to the return movement of the gather past the marverer, a latch for holding the marverer in its retracted position, and means for releasing the latch after the return movement of the gather past the marverer.

8. In a glass blowing machine, the combination with a frame, adapted to receive a blow-pipe, of a marverer, a reciprocating actuator for the blow-pipe frame adapted to move the blow-pipe with the gather on the blow-pipe thereon along the marverer in one direction for marvering and for returning the gather past the marverer in the opposite direction, means controlled by the actuator near the end of its movement to cause marvering to retract the marverer away from the plane of movement of the gather, a latch to hold the marverer when retracted, and means upon the actuator to release the latch after the return of the gather past the marverer.

In testimony whereof I have hereunto signed my name.

BENJAMIN DAY CHAMBERLIN.

In the presence of—
DELPHIN KEAGLE,
G. WILLIS DRAKE.